United States Patent
Isokangas et al.

(10) Patent No.: US 11,323,925 B2
(45) Date of Patent: May 3, 2022

(54) RESOURCE SELECTION METHOD, DEVICE AND COMPUTER STORAGE MEDIUM

(71) Applicant: GUANGDONG OPPO MOBILE TELECOMMUNICATIONS CORP., LTD., Guangdong (CN)

(72) Inventors: Jari Jaakko Isokangas, Tampere (FI); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/648,198

(22) PCT Filed: Sep. 13, 2018

(86) PCT No.: PCT/CN2018/105594
§ 371 (c)(1),
(2) Date: Mar. 17, 2020

(87) PCT Pub. No.: WO2019/056980
PCT Pub. Date: Mar. 28, 2019

(65) Prior Publication Data
US 2020/0245204 A1 Jul. 30, 2020

Related U.S. Application Data

(60) Provisional application No. 62/561,497, filed on Sep. 21, 2017.

(51) Int. Cl.
*H04W 36/00* (2009.01)
*H04W 76/27* (2018.01)
(Continued)

(52) U.S. Cl.
CPC ... *H04W 36/0072* (2013.01); *H04W 36/0058* (2018.08); *H04W 36/30* (2013.01);
(Continued)

(58) Field of Classification Search
CPC .............. H04W 36/0072; H04W 76/27; H04W 36/0058; H04W 36/30; H04W 72/02;
(Continued)

(56) References Cited

U.S. PATENT DOCUMENTS

2010/0272066 A1 10/2010 Wang
2014/0086112 A1 3/2014 Stern-Berkowitz et al.
(Continued)

FOREIGN PATENT DOCUMENTS

CN 103260232 A 8/2013
CN 103313324 A 9/2013
(Continued)

OTHER PUBLICATIONS

Ericsson: "Further details of handover execution in NR", 3GPP Draft: R2-1702672-Further Details of HO Execution in NR, 3rd Generation Partnership Project (3GPP), Mobilecompetence Centre; 650, Route Des Lucioles: F-06921 Sophia-Antipolis Cedex France vol. Ran WG2, no. Spokane, USA: 20170403-201704073 Apr. 2017 (Apr. 3, 2017), XP051244672, Retrieved from the Internet: URL: http://www.3gpp.org/ftp/Meetings 3GPP SYNC/RAN2/Docs/ [retrieved on Apr. 3, 2017] *Table I*.
(Continued)

*Primary Examiner* — Nam T Huynh
(74) *Attorney, Agent, or Firm* — Ladas & Parry LLP (57) ABSTRACT

A resource selection method, a device and a computer storage medium are provided. The method includes that: auxiliary information of first access resources is acquired, wherein the first access resources include at least one of dedicated access resources or common access resources, and the auxiliary information is configured to assist the terminal device to perform resource selection; a second access resource is determined from the first access resources according to the auxiliary information of the first access
(Continued)

resources and resource evaluation information of the first access resources, wherein the second access resource is configure for performing handover.

17 Claims, 3 Drawing Sheets

(51) Int. Cl.
  *H04W 36/30* (2009.01)
  *H04W 72/02* (2009.01)
  *H04W 74/08* (2009.01)
(52) U.S. Cl.
  CPC ....... *H04W 72/02* (2013.01); *H04W 74/0833* (2013.01); *H04W 76/27* (2018.02)
(58) Field of Classification Search
  CPC ........... H04W 74/0833; H04W 74/006; H04W 48/12; H04W 16/28; H04B 7/0695
  See application file for complete search history.

(56) References Cited

U.S. PATENT DOCUMENTS

| | | | |
|---|---|---|---|
| 2014/0128075 A1* | 5/2014 | Da Silva | H04W 36/00837 455/436 |
| 2016/0337961 A1* | 11/2016 | Hu | H04B 17/318 |
| 2017/0135012 A1 | 5/2017 | Zhang et al. | |
| 2017/0142620 A1 | 5/2017 | Rune et al. | |
| 2017/0280481 A1 | 9/2017 | Stern-Berkowitz et al. | |
| 2019/0238255 A1 | 8/2019 | Liu et al. | |
| 2019/0387441 A1 | 12/2019 | Koskela et al. | |
| 2020/0008245 A1* | 1/2020 | Yan | H04W 36/0077 |

FOREIGN PATENT DOCUMENTS

| | | |
|---|---|---|
| CN | 105007606 A | 10/2015 |
| CN | 105578542 A | 5/2016 |
| CN | 105792329 A | 7/2016 |
| CN | 106454893 A | 2/2017 |
| CN | 107079499 A | 8/2017 |
| CN | 107079502 A | 8/2017 |
| EP | 3160200 A1 | 4/2017 |
| EP | 3180955 A1 | 6/2017 |
| WO | 2014130570 | 8/2014 |
| WO | 2016025899 A1 | 2/2016 |
| WO | 2017075805 A1 | 5/2017 |
| WO | 2018127264 A1 | 7/2018 |

OTHER PUBLICATIONS

Intel Corporation: "Basic handoven procedure in NR", 3GPP Draft; R2-1707012, 3rd Generation Partnership Project (3GPP), Mobilecompetence Centre. 650, Route Des Lucioles. F-06921 Sophia-Antipolis Cedex France vol. RAN WG2, no. Qingdao, China; 20179627-2017062928 Jun. 2017 (Jun. 26, 2017), XP051301509, Retrieved from the Internet: URL: http://www.3gpp. org/ftp/Meetings_ 3GPP SYNC/RAN2/Docs/[retrieved on Jun. 26, 2017] * Proposal 6*.
Supplementary Partial European Search Report in the European application No. 18859542.5, dated Apr. 8, 2020.
Supplementary European Search Report in the European application No. 18859542.6, dated Jul. 10, 2020.
Erisson. "Further details of handover execution in NR" 3GPP TSG—RAN WG2 Ad Hoc on NR, Tdoc R2-1707276, Jun. 17, 2017 (Jun. 17, 2017), sections 2-3.
Oppo "Further discussion on open issues for RACH resource handling and usage during handover" 3GPP TSG—RAN2#99, R2-1708366, Aug. 11, 2017 (Aug. 11, 2017), sections 2-3.
Oppo. "Beam selection for RACH procedure during HO" 3GPP TSG-RAN2#99bis, R2-1711482, Sep. 28, 2017 (Sep. 28, 2017), sections 2-3.
International Search Report in the international application No. PCT/CN2018/105594, dated Nov. 23, 2018.
Written Opinion of the International Search Authority in the international application No. PCT/CN2018/105594, dated Nov. 22, 2018.
Intel. "Summary of [NR99#28][NR] Beam selection for HO access" 3GPP TSG-RAN WG2 #99bis, R2-1710588, Oct. 9-13, 2017.
Shu Feng, Yang Shuping, et al, "Overview of Hybrid Beamforming for Millimeter Wave Systems", Data Acquisition and Processing, May 15, 2017.
Yang Laxi, He Shiwen, et al, "Key Technologies for 5G Wireless Communication System", Data Acquisition and Processing, May 15, 2015.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0 (Mar. 2015).
First Office Action of the Chinese application No. 201880028560.4, dated Dec. 15, 2021.

* cited by examiner

RESOURCE SELECTION METHOD, DEVICE AND COMPUTER STORAGE MEDIUM

RELATED APPLICATIONS

This application is an application under 35 U.S.C. 371 of International Application No. PCT/CN2018/105594 filed on Sep. 13, 2018 which claims the benefit of U.S. Provisional Appln. No. 62/561,497 filed on Sep. 21, 2017, the entire contents of each of which are incorporated herein by reference.

TECHNICAL FIELD

Embodiments of the disclosure relate to the field of wireless communications, and more particularly to a resource selection method, a device and a computer storage medium.

BACKGROUND

In the existing mobile cellular communication system, handover procedure for a terminal device generally refers to a procedure that the terminal device releases radio resources from the serving network node and allocates new radio resources from new target network node. Before the terminal device may adopt new radio resources allocated from target network node, synchronization and random access procedures with the target network node are needed to be performed. The procedure may be either contention based or contention free, which depends on whether a common Random Access Channel (RACH) or a dedicated RACH are used for the procedure.

In the contention-based random access procedure, several UEs may select same PRACH resources for accessing. In this case, if several UEs try to access with same PRAM resources, only one UE may succeed and other UEs need to select new resources and try to access again. In the non-contention based random access procedure, the target network node may provide multiple dedicated PRACH resources for the terminal device to be accessed to select.

With the development of communication technology, research on the 5th generation mobile communication technology (5G, 5th Generation) has been conducted. The wireless access in the 5G system is called New Radio, referred to as NR. In the NR system, the PRACH resources required for the handover procedure may be provided in cell level, and may also be provided in beam level. When the granularity is getting smaller and smaller, one of the urgent problems to be solved is to select the optimal beam resource for accessing during the handover process.

SUMMARY

The embodiments of the disclosure provide a resource selection method, a device and a computer storage medium, which enables the terminal device to select the optimal beam resource for accessing during handover.

A first aspect of the disclosure provides a resource selection method, which may be applied to a terminal device and include the following operations. Auxiliary information of first access resources is acquired, wherein the first access resources include at least one of dedicated access resources or common access resources, and the auxiliary information is configured to assist the terminal device to perform resource selection. A second access resource is determined from the first access resources according to the auxiliary information of the first access resources and resource evaluation information of the first access resources, wherein the second access resource is configure for performing handover.

A second aspect of the disclosure provides a resource selection method, which may be applied to a network device and include the following operations. Resource evaluation information of first access resources is sent to a terminal device during handover, wherein the first access resources include at least one of dedicated access resources or common access resources. Auxiliary information of the first access resources is sent to the terminal device, wherein the auxiliary information is configured to assist the terminal device to perform resource selection.

A third aspect of the disclosure provides a terminal device, which is configured to execute the resource selection method in the first aspect. Specifically, the terminal device includes modules configured to execute the resource selection method in the first aspect.

A fourth aspect of the disclosure provides a network device, which is configured to execute the resource selection method in the second aspect. Specifically, the terminal device includes modules configured to execute the resource selection method in the second aspect.

A fifth aspect of the disclosure provides a terminal device, which includes a memory and a processor. The processor is configured to execute a computer program stored in the memory. When the processor executes the computer program stored in the memory, such execution enables the processor to execute the resource selection method in the first aspect.

A sixth aspect of the disclosure provides a network device, which includes a memory and a processor. The processor is configured to execute a computer program stored in the memory. When the processor executes the computer program stored in the memory, such execution enables the processor to execute the resource selection method in the second aspect.

A seventh aspect of the disclosure provides a computer storage medium, in which a program is stored. The program may be executed by one or more processors, such execution enables the processor to execute the resource selection method in the first and second aspect.

The disclosure provides a resource selection method, a device and a computer storage medium. According to the technical solution of the disclosure, a terminal device may perform quality evaluation on the existing resource evaluation information in combination with the auxiliary information, so as to select an access resource suitable for the handover process, such that the terminal device selects the optimal beam resource for access during the handover process.

BRIEF DESCRIPTION OF DRAWINGS

In order to describe the technical solutions of the embodiments of the disclosure more clearly, the drawings required to be used in the embodiments or the conventional art will be simply introduced below. Obviously, the drawings described below are only some embodiments of the disclosure. Other drawings may further be obtained by those of ordinary skilled in the art according to these drawings without creative work.

DETAILED DESCRIPTION

In order to understand the characteristics and the technical solutions of the embodiments of the disclosure in more detail, the implementation of the embodiments of the disclosure will be described clearly and completely below in combination with the drawings. The drawings are merely used for illustrating and not intended to limit the embodiments of the disclosure.

Figure 1:
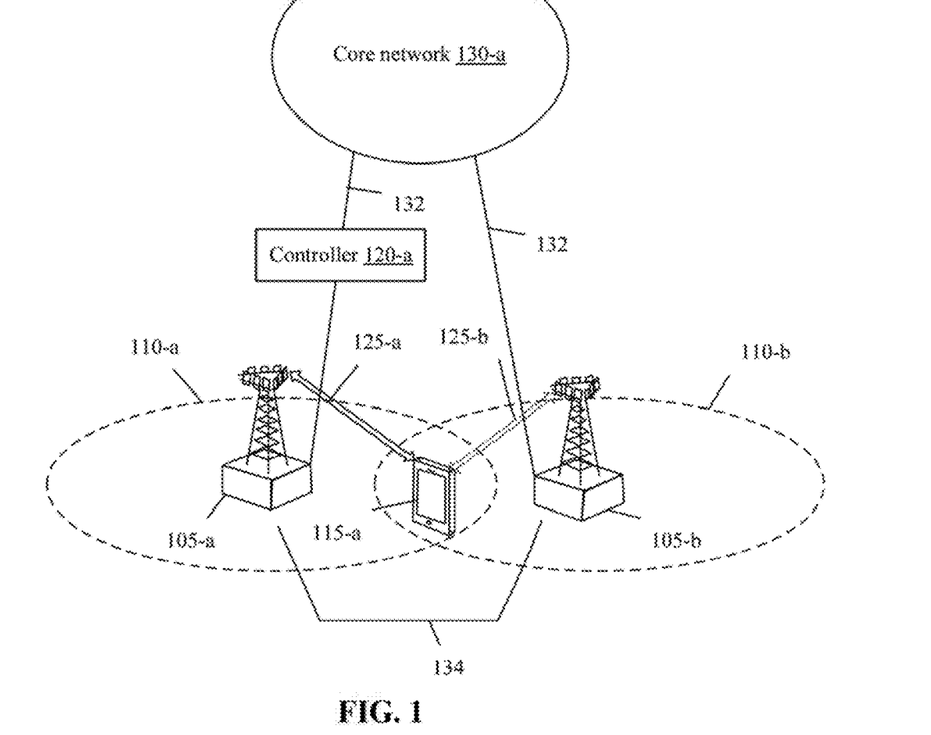
FIG. 1 is a schematic structure diagram of a wireless communication system according to an embodiment of the disclosure.

FIG. 1 illustrates a schematic structure of a wireless communication system 100. Specifically, the wireless communication system 100 may be a Global System of Mobile Communication (GSM), a Code Division Multiple Access (CDMA) system, a Wideband Code Division Multiple Access (WCDMA) system, a General Packet Radio Service (GPRS), a Long Term Evolution (LIE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, a 5G system and the like.

The wireless communication system 100 may include a base station (or a cell) 105, a terminal device 115 and a core network 130. The base station 105 may communicate with the terminal device 115 (generally referred as User Equipment (UE) herein) under the control of a base station controller 120. In various embodiments, the base station controller 120 may be part of the core network 130 or a portion of the base station 105. In a certain case, the base station controller 120 may be located between the core network 130 and one or more base stations 105. The base station 105 may communicate with the core network 130 through a backhaul link 132 for transmission of at least one of control information or user data. The backhaul link may be a wired backhaul link (e.g., copper, fiber optic and the like), and may also be a wireless backhaul link (e.g., microwave and the like). In the embodiments of the disclosure, the base stations 105 may communicate with one another directly or indirectly through a backhaul link 134, and the backhaul link 134 may be a wired communication link or a wireless communication link.

The base station 105 may also perform wireless communication with the terminal device 115 through one or more base station antennas. Each base station 105 may provide communication coverage for the respective geographic area 110. In some embodiments of the disclosure, the base station 105 may also be called as a base transceiver station, a wireless base station, an access point, a wireless transceiver, a basic service set (BBS), an extended service set (ESS), a Node B, an evolved Node B (eNB), Home Node B, Home Evolved Node B, 5G Node gNB or some other suitable terminology. The coverage area 110 of the base station may be divided into sectors (not shown) that form only a part of the coverage area. The system 100 may include different types of base stations 105, such as, macro base stations, micro base stations or pica base stations. There may be overlapping coverage areas for different technologies. In some embodiments, the system 100 may include different radio access technologies, such as 3G (e,g., UMTS) radio access technology (RAT) and 4G (e.g., LTE) RAT. Other examples may include 2G (e.g., GSM) RAT or 5G (e.g., LTE Release 11 and Update and NR) RAT. The coverage areas of different base stations or cells 105 that may utilize these different RATs may overlap. The UEs 115 are located throughout the wireless network 100, and each UE may be fixed or mobile. The UTE 115 may also be called as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a mobile phone, a user agent, a mobile client, a client or some other suitable terminology. The UE 115 may be a cell phone, a personal digital assistant (PDA), a wireless modem, a wireless communication device, a handheld device, a tablet computer, a laptop computer, a cordless telephone, a wireless local loop (WLL) station, handheld equipment with a wireless communication function, a computing device or other processing, device connected to a wireless modem, vehicle-mounted equipment, wearable equipment, terminal equipment in the future 5G network and the like. The UE 115 may generally be capable of communicating with different base stations 105. The different base stations 105 may include base stations or cells 105 capable of adopting different radio access technologies, such as 2G, 3G, 4G and/or 5G NR RATS.

As illustrated in FIG. 1, the base stations 105 may include at least two base stations 105-a and 105-b. The base station 105-a and the base station 105-b may be connected to the core network 130-a through the backhaul link 132, and may also be interconnected through the backhaul link 134, The base station 105-a and the base station 105-b may provide potentially overlapping communication coverage for respective geographic areas 110-a and 110-b. In some cases, the base station 105-a and the base station 105-b may be collocated.

The system 100 illustrated in FIG. 1 may be configured to switch between different RATs. For example, assume that the base station 105-a supports different RATs from the base station 105-b. When UE 115-a may be in the connection mode with the base station 105-a, the UE 115-a may receive system information messages from the base station 105-a via a communication link 125-a according to a first RAT. The communication link 125-a may be called as, or may include a wireless link between the base station 105-a and the UE 115-a. The LIE 115-a may also switch between different RATs, such as switching from the base station 105-a to the base station 105-b. In this case, the base station 105-a may be identified as utilizing a first RAT and the base station 105-b may be identified as utilizing a second RAT.

As for the system 100 illustrated in FIG. 1, during the handover procedure of the UE 115-a from the base station 105-a to the base station 105-b, for example, in LTE/LTE-A, the PRACH configuration may be provided in cell level, while in 5G NR, the PRACH configuration may be provided in beam level. As one beam in NR could cover much smaller area than one cell (i.e., there may be also several Transmission Points (TRP) comprising one cell and there may be several beams under one TRP) in LTE/LTE-A several dedicated PRACH resources need to be provided to the UE during handover procedure. In addition, when the radio quality of beams with dedicated resources is not good enough, for example, the radio condition may be changed very frequently, and then the dedicated RACH resource allocated by the network may not be suitable for UE when UE is accessing to the network, the UE may not be even able to use the dedicated resources to access the target cell due the bad quality of beams. In this case, the UE may need to use another beam with common resources for accessing to target NW node.

For the above issues, the embodiments of the disclosure are desired to provide necessary auxiliary information to the terminal device during handover procedure, such that the terminal device may be guided to select the access resources. Based on this, the specific solutions of the embodiments of the disclosure are described below in combination with the accompanying drawings.

Figure 2:
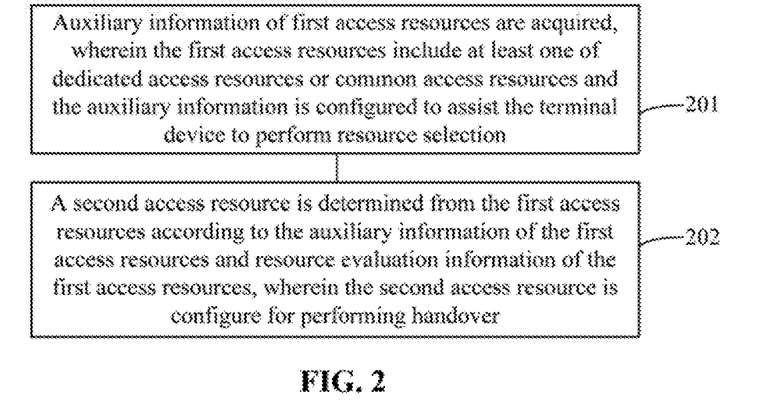
FIG. 2 is a schematic flowchart of a resource selection method according to an embodiment of the disclosure.

FIG. 2 illustrates a flowchart of a resource selection method according to an embodiment of the disclosure. The method may be applied to the terminal device in the system illustrated in FIG. 1, and the method may include the operations at blocks 201-202.

At block 201, auxiliary information of first access resources are acquired, wherein the first access resources include at least one of dedicated access resources or common access resources, and the auxiliary information is configured to assist the terminal device to perform resource selection.

At block 202, a second access resource is determined from the first access resources according to the auxiliary information of the first access resources and resource evaluation information of the first access resources, wherein the second access resource is configure for performing handover.

In the technical solution illustrated in FIG. 2, the first access resources include the second access resource. The term "resource" may refer to a carrier that accesses a target network node in a handover procedure. For example, as for the base station 105 of the system illustrated in FIG. 1, when the terminal device desires to switch from the base station 105-a to the target network node (i.e., the base station 105-b), if the system corresponds to an LTE/LTE-A system, the base station 105-b may provide several cells for the terminal device to access during the handover procedure. If the system corresponds to a 5G NR system, the base station 105-b may provide access resources in cell level, and may also provide access resources in beam level. That is to say, in the 5G NR system, the terminal device may be access the base station 105-b through the access resources in beam level. In order to guarantee that the terminal device access the target network node through the access resource with better quality during handover, the terminal device may acquire the auxiliary information of each first access resource provided by the target network node, and then determine the second access resource for accessing the target network node from the first access resources in combination with the auxiliary information and the existing resource evaluation information of the first access resource. It should be noted that the first access resources may be dedicated access resources, such as dedicated RACH resource, may also be common access resources, such as common RACH resource, and further may be dedicated access resources and common access resources. There are no limits made thereto in the embodiments of the disclosure. Therefore, the technical solution illustrated in FIG. 2 enables the terminal device to select not only the dedicated access resources for accessing but also the optimal beam resource for accessing during the handover procedure.

In at least one embodiment of the disclosure, the resource evaluation information of each first access resource may include at least one of: a minimum threshold value Qrxlevmin for receiving a cell signal or a minimum quality value Qqualmin. It should be noted that the resource evaluation information may be used to evaluate the quality of each first access resource. The resource evaluation information exemplified herein is usually broadcasted to the UE through system information, such as SIB1. Generally, based on the resource evaluation information, corresponding offset values are configured in IDLE mode cell or beam selection procedure, such that the UE may select a cell or beam for accessing according the offset values along with the corresponding Qrxlevmin or Qqualmin value. As for a handover procedure, however, a signal level requirement during handover would differ from a signal level requirement during IDLE mode resource selection, and thus the additional offset value need to be defined for resource selection during handover. In the embodiments of the disclosure, in one case, the auxiliary information may include at least one of a first offset value corresponding to a Qrxlevmin value of each first access resource or a second offset value corresponding to a Qqualmin value of each first access resource.

In addition, the resource evaluation information exemplified above may be used to evaluate the quality of the first access resources to some extent, and in an alternative example, the first offset value corresponding to a Qrxlevmin value of each first access resource or the second offset value corresponding to a Qqualmin value of each first access resource may be used along with Qrxlevmin values or Qqualmin values of the first access resources to indicate quality of each first access resource during handover. In order to achieve objective quality evaluation, in another ease, the auxiliary information may also be a threshold determined for resource selection.

In combination with the above two cases, the auxiliary information in the embodiments of the disclosure may include at least one of a threshold for resource selection during the handover, a first offset value corresponding to a Qrxlevmin value of each first access resource, or a second offset value corresponding to a Qqualmin value of each first access resource.

It should be noted that the threshold for resource selection during the handover in the auxiliary information may be a threshold generated by reusing the existing Qrxlevmin value and/or Qqualmin value, and may also be a new additional threshold PRACHlevmin. Further, it is to be noted that the auxiliary information described above may be carried in system information together with the resource evaluation information and sent to the terminal device. Therefore, in at least one embodiment of the disclosure, the operation at block 201 that the auxiliary information of the first access resources is acquired may include that a first system information sent by a network device is received, wherein the first system information may include the auxiliary information of the first access resources, and include at least one of Qrxlevmin values of the first access resources or Qqualmin values of the first access resources. In a specific implementation mode, for example, the first system information may be SIB1.

When the auxiliary information merely includes at least one of the first offset values or the second offset values of the first access resources, as both of the offset values correspond to respective Qrxlevmin values and Qqualmin values of the first access resources, the auxiliary information may be carried in a second system information different from the first system information and sent to the terminal device. Therefore, in an alternative example, the operation at block 201 that the auxiliary information of the first access resources is acquired may include that a first system information and a second system information sent by a network device are received, wherein the first system information may include at least one of Qrxlevmin values or Qqualmin values of the first access resources, and the second system information may include the auxiliary information of the first access resources. It is to understand that the first system information may be SIB1, and the second system information may be other SIBs, such as SIB2.

During access, the terminal device, acting as an execution entity, performs the resource selection, and the auxiliary information may be determined by the terminal device. In an alternative example, the operation at block 201 that the auxiliary information of the first access resources is acquired may include that at least one a first offset value for a Qrxlevmin value of each first access resource or a second offset value for a Qqualmin value of each first access resource may be determined according capability information of the terminal device.

As described above, the auxiliary information may include the threshold for resource selection during the handover. In at least one alternative embodiment, the operation at block 201 that the auxiliary information of the first access resources is acquired may include that radio resource control (RRC) dedicated signaling carrying the auxiliary information is received. It is to understand that the RRC dedicated signaling may be RRC signaling that is required to be sent by the network device to the terminal device during the handover procedure, such as RRC reconfiguration signaling, which will not be elaborated herein.

In specific implementations of the embodiments of the disclosure, the operation at block 202 may be performed in different implementations according to the contents of the auxiliary information.

In at least one embodiment, when the auxiliary information includes at least one of the first offset values or the second offset values of the firm access resources, the operation that the second access resource is determined from the first access resources according to the auxiliary information of the first access resource and resource evaluation information of the first access resource may include the following actions.

Quality evaluation parameters of the first access resources may be determined according to at least one of Qrxlevmin values of the first access resources and the first offset values corresponding to respective Qrxlevmin values of the first access resources, or Qqualmin values of the first access resources and the second offset values corresponding to respective Qqualmin values of the first access resources. The quality evaluation parameter may indicate quality of the first access resource.

According to the quality evaluation parameters, a resource with an optimal quality in the first access resource may be determined as the second access resource.

In the embodiment described above, it should be noted that when the access resources are in beams level, the target network node may provide several beams. Some of the beams may belong to dedicated random access (RACH) resources, and some may belong to common RACH resources. In order to avoid access through a dedicated RACH resource unavailable for the handover procedure, such as a dedicated RACH resource with bad quality, the terminal device may evaluate the quality of the first access resources according to at least one of Qrxlevmin values or Qqualmin values of the first access resources along with respective first offset values or the second offset values of the first access resources, and then select a beam with a better quality for accessing. The selected beam may belong to the dedicated RACH resource, and may also belong to the common RACH resource. Therefore, even when there is no dedicated resource with high quality during the handover procedure, the terminal device is still able to access a target network node through a common resource with high quality. In a specific implementation of the embodiment, access resources may be ranked according to the quality evaluation parameters, and the access resource with a higher rank has a higher quality. Therefore, according to the quality evaluation parameters, one or more the first access resources with a high rank may be determined as resources with an optimal quality. It is to understand that when there is more than one access resource with a high rank, as a selection strategy, the second access resource may be randomly selected from the access resources with a high rank. However, those skilled in the art may also select other selection strategies that can be applied, which will be not elaborated herein.

In at least one alternative embodiment, when the auxiliary information includes the threshold for resource selection during the handover and at least one of the first offset values or the second offset values of the first access resources, the operation that the second access resource is determined from the first access resources according to the auxiliary information of the first access resource and resource evaluation information of the first access resource may include the following actions.

Quality evaluation parameters of the first access resources may be determined according to at least one of Qrxlevmin values of the first access resources and the first offset values corresponding to respective Qrxlevmin values of the first access resources, or Qqualmin values of the first access resources and the second offset values corresponding to respective Qqualmin values of the first access resources. The quality evaluation parameter indicates quality of the first access resource.

A resource with a quality evaluation parameter exceeding the threshold may be determined as the second access resource.

In the embodiment, a threshold may be set in order to quantify the quality of the first access resources. The resource with a quality evaluation parameter exceeding the threshold may be considered as the resource with the optimal quality, and thus may be determined as the second access resource for performing handover. It is to understand that when there is more than one access resource with a quality evaluation parameter exceeding the threshold, the second access resource may be selected according to the selection strategy described in the previous embodiment, which will be not elaborated herein.

In at least one alternative embodiment, when the auxiliary information includes the threshold for resource selection during the handover, the operation that the second access resource is determined from the first access resources according to the auxiliary information of the first access resource and resource evaluation information of the first access resource may include the following actions.

Qrxlevmin values of the first access resources or Qqualmin values of the first access resources may be compared with the threshold.

A resource with at least one of a Qrxlevmin value or a Qqualmin value exceeding, the threshold may be determined as the second access resource.

In the embodiment, it should be noted that Qrxlevmin values or Qqualmin values of the first access resources may indicate the quality of each first access resource independently, without in combination with the offset values. Therefore, the Qrxlevmin values or Qqualmin values of the first access resources may be compared with the threshold directly, and a resource with high quality in the first access resources may be determined as the second access resource. The specific selection strategy may be same as that described in the previous embodiment, which will be not elaborated herein.

Figure 3:
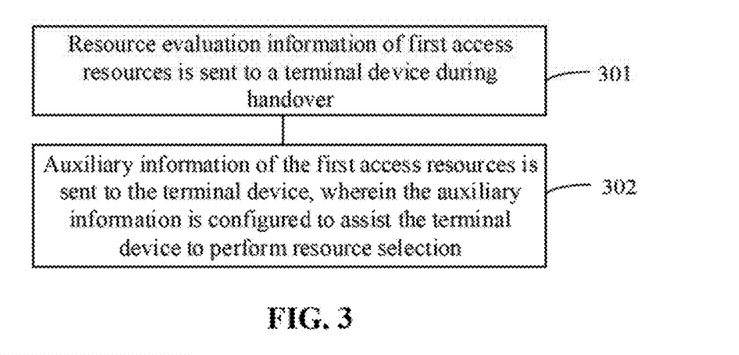
FIG. 3 is another schematic flowchart of a resource selection method according to an embodiment of the disclosure.

Based on the same inventive concept as the previous technical solution illustrated in FIG. 2, FIG. 3 illustrates a flowchart of a resource selection method according to an embodiment of the disclosure. The method may be applied to a network device. The network device may be specifically refers to a target network node during handover, such as the base station 105-*b* in the system illustrated in FIG. 1. The method may include the operations at blocks 301-302.

At block 301, resource evaluation information of first access resources is sent to a terminal device during handover.

In the embodiments of the disclosure, the first access resources may include at least one of dedicated access resources or common access resources, and the resource evaluation information of each first access resource may include at least one of: a minimum threshold value Qrxlevmin for receiving a cell signal or a minimum quality value Qqualmin.

At block 302, auxiliary information of the first access resources is sent to the terminal device, wherein the auxiliary information is configured to assist the terminal device to perform resource selection.

It should be noted that the network device may send the auxiliary information to the terminal device, such that the terminal device may be able to select the optimal access resource from the access resources to be selected according the resource evaluation information and the auxiliary information.

As for the technical solution illustrated in FIG. 3, in at least one embodiment, the auxiliary information may include at least one of a threshold for resource selection during the handover, a first offset value corresponding to a Qrxlevmin value of each first access resource, or a second offset value corresponding to a Qqualmin value of each first access resource.

The auxiliary information may be sent to the terminal device together with the resource evaluation information of the first access resources. In an alternative example, the auxiliary information and the evaluation information may be separately sent to the terminal device. Specifically, the operation that the auxiliary information of the first access resources is sent to the terminal device may include the following action.

A first system information may be sent to the terminal device, wherein the first system information may include the auxiliary information of the first access resources, and include at least one of Qrxlevmin values of the first access resources or Qqualmin values of the first access resources.

In at least one alternative embodiment, when it is determined that the auxiliary information includes at least one of the first offset values or the second offset values of the first access resources, the operation that the auxiliary information of the first access resources is sent to the terminal device may include the following action.

A first system information and a second system information may be sent to the terminal device, wherein the first system information may include at least one of Qrxlevmin values or Qqualmin values of the first access resources, and the second system information may include the auxiliary information of the first access resources.

In at least one alternative embodiment, when it is determined that the auxiliary information includes the threshold for resource selection during the handover, the operation that the auxiliary information of the first access resources is sent to the terminal device may include that RRC dedicated signaling carrying the auxiliary information may be sent to the terminal device.

It should be noted that, the specific implementation of the technical solution illustrated in FIG. 3 may be made reference to the corresponding content of the technical solution illustrated in FIG. 2, which will be not elaborated herein.

Figure 4:
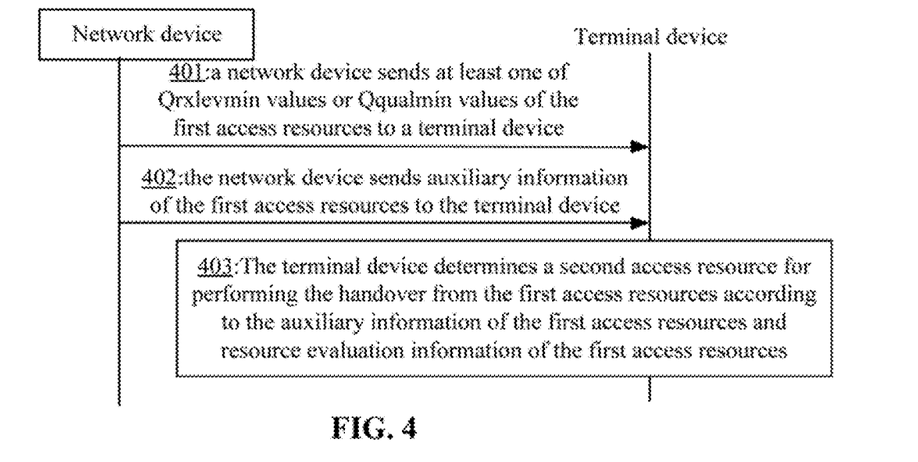
FIG. 4 is a schematic flowchart of implementation of a resource selection method according to an embodiment of the disclosure.

Based on the technical solutions illustrated in FIG. 2 and FIG. 3, FIG. 4 illustrates a flowchart of implementation of a resource selection method according to an embodiment of the disclosure. The specific implementation of the resource selection method may be applied to the system illustrated in FIG. 1, and include the following operations.

In 401, a network device sends at least one of Qrxlevmin values or Qqualmin values of the first access resources to a terminal device.

The first access resources may include at least one of dedicated access resources or common access resources. In a specific implementation of the operation, at least one of Qrxlevmin values or Qqualmin values may be carried in SIB1 and broadcast to the terminal device.

In 402, the network device sends auxiliary information of the first access resources to the terminal device.

It should be noted that the auxiliary information may be used to assist the terminal device to perform resource selection during handover along with at least one of Qrxlevmin values or Qqualmin values.

Specifically, the auxiliary information may include at least one of a threshold for resource selection during the handover, a first offset value corresponding to a Qrxlevmin value of each first access resource, or a second offset value corresponding to a Qqualmin value of each first access resource.

In a specific implementation of the operation, the auxiliary information and at least one of Qrxlevmin values or Qqualmin values may be carried together in the in SIB1 and broadcast to the terminal device. That is to say, the, operations in 401 and 402 may be performed through a same SIB. In an alternative implementation, when it is determined that the auxiliary information merely includes at least one of the first offset values or the second offset values of the first access resources, the auxiliary information may be carried in other SIB except SIB1 and broadcast to the terminal device. In another alternative implementation, when the auxiliary information merely includes the threshold for resource selection during the handover, the auxiliary information may be carried in RRC dedicated signaling and sent to the terminal device. The RRC dedicated signaling, for example, may be the RRC signaling that is required to be sent to the terminal device during the handover procedure.

In 403, the terminal device determines a second access resource for performing the handover from the first access resources according to the auxiliary information of the first access resources and resource evaluation information of the first access resources.

The implementations of the operation in 403 may be different as the different contents of the auxiliary information.

In at least one embodiment, when the auxiliary information includes at least one of the first offset values or the second offset values of the first access resources, the operation in 403 may include the following actions.

Quality evaluation parameters of the first access resources may be determined according to at least one of Qrxlevmin values of the first access resources and the first offset values, or Qqualmin values of the first access resources and the second offset values. The quality evaluation parameter may indicate quality of the first access resource.

According to the quality evaluation parameters, a resource with an optimal quality in the first access resource may be determined as the second access resource.

In at least one alternative embodiment, when the auxiliary information includes the threshold for resource selection during the handover and at least one of the first offset values or the second offset values of the first access resources, the operation in 403 may include the following actions.

Quality evaluation parameters of the first access resources may be determined according to at least one of Qrxlevmin values of the first access resources and the first offset values, or Qqualmin values of the first access resources and the second offset values.

A resource with a quality evaluation parameter exceeding the threshold may be determined as the second access resource.

In at least one alternative embodiment, when the auxiliary information includes the threshold for resource selection during the handover, the operation in 403 may include the following actions.

Qrxlevmin values of the first access resources or Qqualmin values of the first access resources may be compared with the threshold.

A resource with at least one of a Qrxlevmin value or a Qqualmin value exceeding the threshold may be determined as the second access resource.

It is to understand that the detailed description of the embodiment mentioned above may be made reference to the description of the technical solution illustrated in FIG. 2, which will be not elaborated herein.

Through the implementation of the method illustrated in FIG. 4, the terminal device may perform quality evaluation on the access resource according to the auxiliary information along with the resource evaluation information provided by the network device, and guide the selection of the access resources to select an access more suitable for the handover process, such that the terminal device may be able to select the optimal beam resource for accessing during handover.

Figure 5:
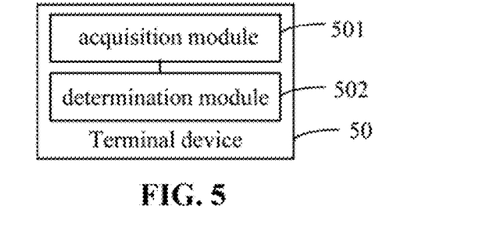
FIG. 5 is a schematic block diagram of a terminal device according to an embodiment of the disclosure.

Based on the same inventive concept as the ahovementioned embodiments of the disclosure, FIG. 5 illustrates a terminal device 50 according to an embodiment of the disclosure. The terminal device includes an acquisition module 501 and a determination module 502.

The acquisition module 501 is configured to acquire auxiliary information of first access resources. The first access resources may include at least one of dedicated access resources or common access resources, and the auxiliary information may be configured to assist the terminal device to perform resource selection.

The determination module 502 is configured to determine a second access resource from the first access resources according to the auxiliary information of the first access resources and resource evaluation information of the first access resources, wherein the second access resource is configure for performing handover.

In at least one implementation mode of the terminal device illustrated in FIG. 5, the resource evaluation information of each first access resource may include at least one of: a minimum threshold value Qrxlevmin for receiving a cell signal or a minimum quality value Qqualmin.

In the above implementation mode, the auxiliary information may include at least one of: a threshold for resource selection during the handover; a first offset value corresponding to a Qrxlevmin value of each first access resource; or a second offset value corresponding to a Qqualmin value of each first access resource.

In at least one embodiment, the acquisition module 501 may further configured to receive a first system information sent by a network device. The first system information may include the auxiliary information of the first access resources, and include at least one of Qrxlevmin values of the first access resources or Qqualmin values of the first access resources.

In at least one embodiment, when the auxiliary information includes at least one of the first offset values or the second offset values of the first access resources, the acquisition module 501 may further configured to receive a first system information and a second system information sent by a network device. The first system information may include at least one of Qrxlevmin values or Qqualmin values of the first access resources, and the second system information may include the auxiliary information of the first access resources.

In at least one embodiment, when the auxiliary information includes at least one of the first offset values or the second offset values of the first access resources, the acquisition module 501 may further configured to determine at least one of a first offset value for a Qrxlevmin value or a second offset value for a Qqualmin value of each first access resource according to capability information of the terminal device.

In at least one embodiment, when the auxiliary information includes the threshold for resource selection during the handover, the acquisition module 501 may further configured to receive Radio Resource Control (RRC) dedicated signaling carrying the auxiliary information.

In at least one embodiment, the determination module 502 may further configured to, responsive to determining that the auxiliary information includes at least one of the first offset values or the second offset values of the first access resources, determine quality evaluation parameters of the first access resources according to at least one of Qrxlevmin values of the first access resources and the first offset values corresponding to respective Qrxlevmin values of the first access resources, or Qqualmin values of the first access resources and the second offset values corresponding to respective Qqualmin values of the first access resources, wherein the quality evaluation parameters indicate quality of the first access resources. Then, according to the quality evaluation parameters, the determination module 502 may determine a resource with an optimal quality in the first access resource as the second access resource.

In at least one embodiment, the determination module 502 may further configured to, responsive to determining that the auxiliary information includes the threshold for resource selection during the handover and at least one of the first offset values or the second offset values of the first access resources, determine quality evaluation parameters of the first access resources according to at least one of: Qrxlevmin values of the first access resources and the first offset values corresponding to respective Qrxlevmin values of the first access resources, or Qqualmin values of the first access resources and the second offset values corresponding to respective Qqualmin values of the first access resources, wherein the quality evaluation parameters indicate quality of the first access resources. Then, the determination module 502 may determine a. resource with a quality evaluation parameter exceeding the threshold as the second access resource.

In at least one embodiment, responsive to determining that the auxiliary information includes the threshold for resource selection during the handover, the determination module 502 may be further configured to compare Qrxlevmin values of the first access resources or Qqualmin values of the first access resources with the threshold and determine a resource with at least one of a Qrxlevmin value or a Qqualmin value exceeding the threshold as the second access resource.

In the embodiments of the disclosure, a term "module" and the like used in the specification may be a circuit, a processor, a subroutine program, a software program and the like, which may be modular or non-modular.

In addition, each module in each embodiment of the disclosure may be integrated into a processing unit, each unit may also exist independently, and two or more than two units may also be integrated into a unit. The above integrated units may be implemented in hardware or in the form of software function modules.

When being implemented in form of software function units and sold or used as an independent product, the integrated unit may also be stored in a computer-readable storage medium. Based on such an understanding, the technical solutions of the disclosure substantially or parts making contributions to a related art may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a Read Only Memory (ROM), a Random Access Memory (RAM), a magnetic disk or an optical disk.

The embodiments of the disclosure provide a computer-readable storage medium having stored thereon one or more programs for resource selection that, when executed by at least one processor, cause the processor to execute the resource selection method of the disclosure illustrated in FIG. 2.

Figure 6:
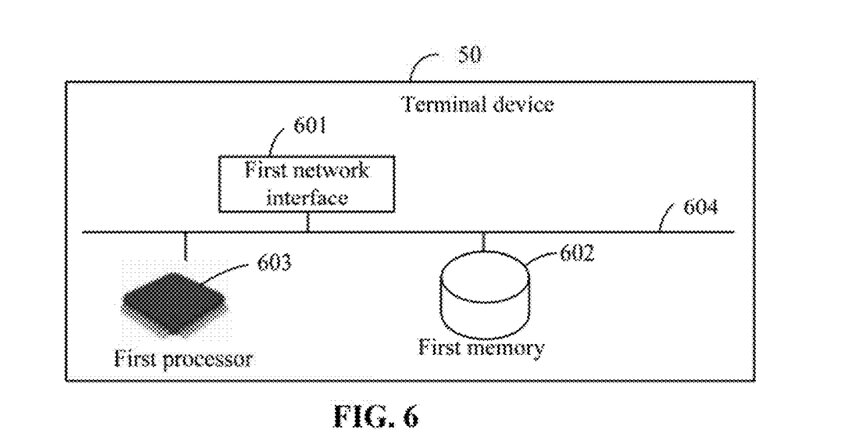
FIG. 6 is a schematic diagram of hardware components of a terminal device according to an embodiment of the disclosure.

Based on the terminal device 50 and the computer-readable storage medium FIG. 6 illustrates a structure diagram of hardware components of the terminal device 50 according to an embodiment of the disclosure. The terminal device 50 may include a first network interface 601, a first memory 602 and a first processor 603. All components are coupled together via a bus system 604. The bus system 604 is configured for connecting the components in communication. In addition to a data bus, the bus system 604 may include a power bus, a control bus and a state signal bus. For clarity, various buses in FIG. 6 are denoted as the bus system 604.

The first network interface 601 may be configured to receive and send signals during a process of sending and receiving information with other external network elements.

The first memory 602 may be configured to store computer programs running on the first processor 603.

The first processor 603 may be configured to execute the following operations when executing the computer programs. Auxiliary information of first access resources are acquired, wherein the first access resources include at least one of dedicated access resources or common access resources, and the auxiliary information is configured to assist the terminal device to perform resource selection. A second access resource is determined from the first access resources according to the auxiliary information of the first access resources and resource evaluation information of the first access resources, wherein the second access resource is configure for performing handover.

It is to be understood that the first memory 602 in the embodiment of the disclosure may be a volatile memory or a nonvolatile memory, or may include both the volatile and nonvolatile memories. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is important to note that the memory of a system and method described in the disclosure is intended to include, but not limited to, memories of these and any other proper types.

The first processor 603 may be an integrated circuit chip with a signal processing capability. In an implementation process, each operation of the method embodiments may be completed by an integrated logical circuit of hardware in the first processor 603 or an instruction in a software form. The first processor 603 may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in this field such as a RAM, a flash memory, a ROM, a PROM or EEPROM and a register. The storage medium may be located in the first memory 602, and the first processor 603 reads information in the first memory 602, and completes the steps of the methods in combination with hardware.

It should be understood that the embodiments described herein may be implemented in hardware, software, firmware, middleware, microcode, or a combination thereof. For the hardware implementation, the processing unit may be implemented in one or more ASICs, DSPs, programmable logic devices (PLDs), FPGA, a general purpose processor, or other electronic units or combination for performing the present disclosure. For software implementations, the solution described herein may be implemented by the modules (e.g., processes, functions and the like) with the functions described herein.

In a specific embodiment of the disclosure, the first processor 603 in the terminal device 50 may further be configured to execute computer programs stored in the memory to implement the operations of the resource selection method illustrated in FIG. 2. This will not be elaborated herein to avoid repetition.

Figure 7:
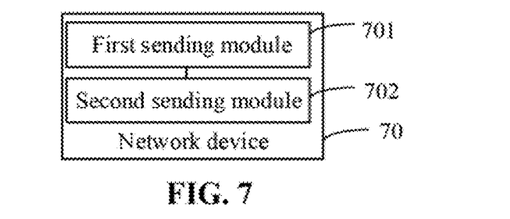
FIG. 7 is a schematic block diagram of a network device according to an embodiment of the disclosure.

Based on the same inventive concept as the abovementioned embodiments of the disclosure, FIG. 7 illustrates a network device 70 according to an embodiment of the disclosure. The network device 70 includes a first sending module 701 and a second sending module 702.

The first sending module 701 is configured to send resource evaluation information of first access resources to a terminal device during handover. The first access resources include at least one of dedicated access resources or common access resources.

The second sending module 702 is configured to send auxiliary information of the first access resources to the terminal device, wherein the auxiliary information is configured to assist the terminal device to perform resource selection.

In at least one implementation mode of the network device illustrated in FIG. 7, the resource evaluation information of each first access resource may include at least one of: a minimum threshold value Qrxlevmin for receiving a cell signal or a minimum quality value Qqualmin.

In at least one embodiment, the auxiliary information may include at least one of a threshold for resource selection during the handover, a first offset value corresponding to a Qrxlevmin value of each first access resource or a second offset value corresponding to a Qqualmin value of each first access resource.

In at least one embodiment, the second sending module 702 may further be configured to send a first system information to the terminal device, wherein the first system information includes the auxiliary information of the first access resources, and includes at least one of Qrxlevmin values of the first access resources or Qqualmin values of the first access resources.

In at least one embodiment, when the auxiliary information includes at least one of the first offset values or the second offset values of the first access resources, the second sending module 702 may further be configured to send a first system information and a second system information to the terminal device, wherein the first system information includes at least one of Qrxlevmin values or Qqualmin values of the first access resources, and the second system information includes the auxiliary information of the first access resources.

In at least one embodiment, when the auxiliary information includes the threshold for resource selection during the handover, the second sending module 702 may further be configured to send radio resource control (RRC) dedicated signaling carrying the auxiliary information to the terminal device.

In addition, the embodiment of the disclosure provides a computer storage medium. The computer storage medium stores one or more programs for resources selection, and the programs may be executed by at least one processor to implement the operations of the method illustrated in FIG. 3. The description about the computer-readable storage medium may make reference to the description of abovementioned embodiments of the disclosure, which will not be elaborated herein to avoid repetition.

Figure 8:
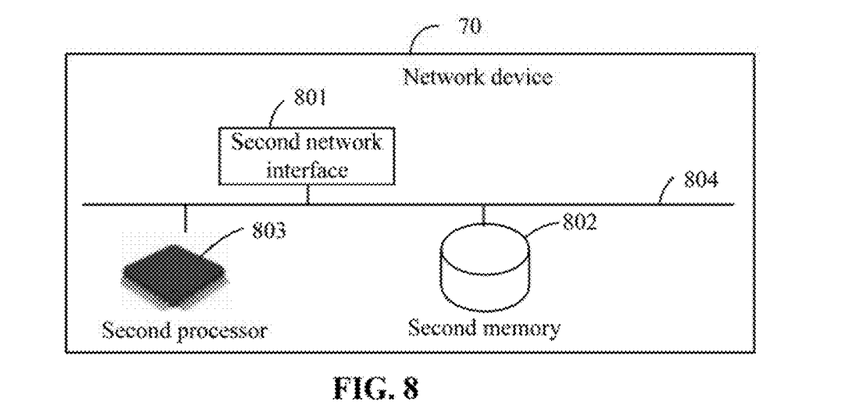
FIG. 8 is a schematic diagram of hardware components of a network device according to an embodiment of the disclosure.

Based on the network device 70 and the computer-readable storage medium, FIG. 8 illustrates a structure diagram of hardware components of the network device 70 according to an embodiment of the disclosure. The network device 70 may include a second network interface 801, a second memory 802 and a second processor 803. All components are coupled together via a bus system 804. The bus system 804 is configured for connecting the components in communication. In addition to a data bus, the bus system 804 may include a power bus, a control bus and a state signal bus. For clarity, various buses in FIG. 8 are denoted as the bus system 804.

The second network interface 801 may be configured to receive and send signals during a process of sending and receiving information with other external network elements.

The second memory 802 may be configured to store computer programs running on the second processor 803.

The second processor 803 may be configured to execute the following operations when executing the computer programs. Resource evaluation information of first access resources is sent to a terminal device during handover, wherein the first access resources may include at least one of dedicated access resources or common access resources. Auxiliary information of the first access resources is sent to the terminal device, wherein the auxiliary information is configured to assist the terminal device to perform resource selection.

It is to be understood that the hardware components of the network device 70 are similar to the components described in abovementioned embodiments of the disclosure, which will not be elaborated herein to avoid repetition.

In a specific embodiment of the disclosure, the second processor 803 in the network device 70 may further be configured to execute computer programs to implement the operations of the resource selection method illustrated in FIG. 3. This will not be elaborated herein to avoid repetition.

It is to be noted that the technical solutions described in the embodiments of the disclosure may be arbitrarily combined without conflict. The above are only the preferred embodiments of the disclosure and not intended to limit the scope of protection of the disclosure. Any modifications, equivalent substitutions and improvements made within the spirit and principle of the disclosure are deemed to be included within the scope of protection of the disclosure.

INDUSTRIAL APPLICABUITY

In the embodiments of the disclosure, the terminal device may perform quality evaluation on the existing resource evaluation information in combination with the auxiliary information, so as to select an access resource suitable for the handover process, such that the terminal device selects the optimal beam resource for access during the handover process.

The invention claimed is:
1. A resource selection method, applied to a terminal device, the method comprising:
receiving first system information from a network device, wherein the first system information comprises resource evaluation information of first access resources; each of the first access resources comprises at least one of dedicated access resource or common access resource, and the resource evaluation information of the first access resource comprises at least one of a minimum threshold value Qrxlevmin for receiving a cell signal or a minimum quality value Qqualmin;

receiving second system information from the network device, wherein the second system information is different from the first system information and comprises auxiliary information of the first access resources, the auxiliary information is configured to assist the terminal device to perform resource selection and comprises at least one of a first offset value or a second offset value; and determining a second access resource from the first access resources according to the auxiliary information of the first access resources and the resource evaluation information of the first access resources, wherein the second access resource is configured for performing handover.

2. The method according to claim 1, wherein the auxiliary information further comprises a threshold for resource selection during the handover;

wherein the first offset value corresponds to the Qrxlevmin value of each first access resource; and the second offset value corresponds to the Qqualmin value of each first access resource.

3. The method according to claim 2, wherein when the auxiliary information comprises the threshold for resource selection during the handover, the auxiliary information of the first access resources is acquired by:

receiving radio resource control (RRC) dedicated signaling comprising the auxiliary information.

4. The method according to claim 2, wherein determining the second access resource from the first access resources according to the auxiliary information of the first access resource and resource evaluation information of the first access resource comprises: responsive to determining that the auxiliary information comprises the threshold for resource selection during the handover, comparing Qrxlevmin values of the first access resources or Qqualmin values of the first access resources with the threshold; and determining a resource with at least one of a Qrxlevmin value or a Qqualmin value exceeding the threshold as the second access resource.

5. The method according to claim 1, wherein the auxiliary information of the first access resources is acquired by at least one of the following:

determining, according to capability information of the terminal device, the first offset value for the Qrxlevmin value of each first access resource; or determining, according to capability information of the terminal device, the second offset value for the Qqualmin value of each first access resource.

6. The method according to claim 1, wherein determining the second access resource from the first access resources according to the auxiliary information of the first access resource and the resource evaluation information of the first access resource comprises:

determining quality evaluation parameters of the first access resources according to at least one of: Qrxlevmin values of the first access resources and the first offset values corresponding to respective Qrxlevmin values of the first access resources, or Qqualmin values of the first access resources and the second offset values corresponding to respective Qqualmin values of the first access resources, wherein the quality evaluation parameters indicate quality of the first access resources; and determining, according to the quality evaluation parameters, a resource with an optimal quality in the first access resource as the second access resource.

7. The method according to claim 1, wherein determining the second access resource from the first access resources according to the auxiliary information of the first access resource and the resource evaluation information of the first access resource comprises:

determining quality evaluation parameters of the first access resources according to at least one of: Qrxlevmin values of the first access resources and the first offset values corresponding to respective Qrxlevmin values of the first access resources, or Qqualmin values of the first access resources and the second offset values corresponding to respective Qqualmin values of the first access resources, wherein the quality evaluation parameters indicate quality of the first access resources; and determining a resource with a quality evaluation parameter exceeding the threshold as the second access resource.

8. A terminal device, comprising:

a processor; and a memory for storing instructions executable by the processor;

wherein the processor is configured to:

receive, through a first network interface, first system information from a network device, wherein the first system information comprises resource evaluation information of first access resources; each of the first access resources comprises at least one of dedicated access resource or common access resource, and the resource evaluation information of the first access resource comprises at least one of a minimum threshold value Qrxlevmin for receiving a cell signal or a minimum quality value Qqualmin;

receive, through the first network interface, second system information from the network device, wherein the second system information is different from the first system information and comprises auxiliary information of the first access resources, the auxiliary information is configured to assist the terminal device to perform resource selection and comprises at least one of a first offset value or a second offset value; and determine a second access resource from the first access resources according to the auxiliary information of the first access resources and the resource evaluation information of the first access resources, wherein the second access resource is configure for performing handover.

9. The terminal device according to claim 8, wherein the auxiliary information further comprises a threshold for resource selection during the handover;

wherein the first offset value corresponds to the Qrxlevmin value of each first access resource; and the second offset value corresponds to the Qqualmin value of each first access resource.

10. The terminal device according to claim 9, wherein when the auxiliary information comprises the threshold for resource selection during the handover, the processor is further configured to:

receive radio resource control (RRC) dedicated signaling comprising the auxiliary information.

11. The terminal device according to claim 9, wherein the processor is further configured to: responsive to determining that the auxiliary information comprises the threshold for resource selection during the handover, compare Qrxlevmin values of the first access resources or Qqualmin values of the first access resources with the threshold; and determine a resource with at least one of a Qrxlevmin value or a Qqualmin value exceeding the threshold as the second access resource.

12. The terminal device according to claim 8, wherein the processor is further configured to perform at least one of the following:
   determining the first offset value for the Qrxlevmin value of each first access resource according to capability information of the terminal device; or
   determining the second offset value for the Qqualmin value of each first access resource according to capability information of the terminal device.

13. The terminal device according to claim 8, wherein the processor is further configured to:
   determine quality evaluation parameters of the first access resources according to at least one of: Qrxlevmin values of the first access resources and the first offset values corresponding to respective Qrxlevmin values of the first access resources, or Qqualmin values of the first access resources and the second offset values corresponding to respective Qqualmin values of the first access resources, wherein the quality evaluation parameters indicate quality of the first access resources; and
   determine, according to the quality evaluation parameters, a resource with an optimal quality in the first access resource as the second access resource.

14. The terminal device according to claim 8, wherein the processor is further configured to:
   determine quality evaluation parameters of the first access resources according to at least one of: Qrxlevmin values of the first access resources and the first offset values corresponding to respective Qrxlevmin values of the first access resources, or Qqualmin values of the first access resources and the second offset values corresponding to respective Qqualmin values of the first access resources, wherein the quality evaluation parameters indicate quality of the first access resources; and
   determine a resource with a quality evaluation parameter exceeding the threshold as the second access resource.

15. A network device, comprising:
   a processor; and
   a memory for storing instructions executable by the processor;
   wherein the processor is configured to:
   send, through a second network interface, first system information to a terminal device, wherein the first system information comprises resource evaluation information of first access resources; each of the first access resources comprises at least one of dedicated access resource or common access resource, and the resource evaluation information of the first access resource comprises at least one of a minimum threshold value Qrxlevmin for receiving a cell signal or a minimum quality value Qqualmin; and
   send, through the second network interface, second system information to the terminal device, wherein the second system information is different from the first system information and comprises auxiliary information of the first access resources, the auxiliary information is used to assist the terminal device to perform resource selection and comprises at least one of a first offset value or a second offset value, and wherein the auxiliary information of the first access resources and the resource evaluation information of the first access resources are used for the terminal to determine a second access resource from the first access resources, the second access resource is configured for performing handover.

16. The network device according to claim 15, wherein the auxiliary information further comprises a threshold for resource selection during the handover;
   wherein the first offset value corresponds to the Qrxlevmin value of each first access resource; and
   the second offset value corresponds to the Qqualmin value of each first access resource.

17. The network device according to claim 16, wherein when the auxiliary information comprises the threshold for resource selection during the handover, the processor is further configured to:
   send, through a second network interface, radio resource control (RRC) dedicated signaling comprising the auxiliary information to the terminal device.

* * * * *